(12) United States Patent
Haederer et al.

(10) Patent No.: US 11,039,625 B2
(45) Date of Patent: Jun. 22, 2021

(54) FILLING MACHINE AND METHOD FOR FILLING UP LIQUID OR PASTY MASSES WITH EXTERNAL COLLECTING VESSEL

(71) Applicant: Albert Handtmann Maschinenfabrik GmbH & Co. KG, Biberach (DE)

(72) Inventors: Konrad Haederer, Warthausen (DE); Martin Staudenrausch, Biberach (DE); Marcel Nusser, Biberach (DE); Bernd Maile, Oggelshausen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 767 days.

(21) Appl. No.: 15/831,264

(22) Filed: Dec. 4, 2017

(65) Prior Publication Data

US 2018/0153180 A1 Jun. 7, 2018

(30) Foreign Application Priority Data

Dec. 5, 2016 (EP) .................................... 16202200

(51) Int. Cl.
*A22C 11/00* (2006.01)
*A22C 11/06* (2006.01)
(Continued)

(52) U.S. Cl.
CPC ............... *A22C 11/06* (2013.01); *A22C 5/00* (2013.01); *A22C 11/02* (2013.01); *A23L 5/00* (2016.08);
(Continued)

(58) Field of Classification Search
CPC ....... A22C 11/00; A22C 11/001; A22C 11/02; A22C 11/0209; A22C 11/0245;
(Continued)

(56) References Cited

U.S. PATENT DOCUMENTS 3,081,484 A 3/1963 Schnell
7,819,726 B2 * 10/2010 Le Paih ................ F04B 15/023
452/141
(Continued)

FOREIGN PATENT DOCUMENTS

DE 19925417 C1 10/2000
EP 1044612 B1 5/2003
(Continued)

*Primary Examiner* — Richard T Price, Jr.
(74) *Attorney, Agent, or Firm* — McCoy Russell LLP (57) ABSTRACT

The present disclosure relates to a filling machine and a method for filling up pasty or liquid masses, for example for sausage production, with a feed pump, in particular a vane pump, for conveying the pasty or liquid masses, a vacuum pump for generating a vacuum in the feed pump, in particular the vane cells of the vane pump, wherein the feed pump may be connected with the vacuum pump via a first channel and via an integrated collecting vessel for entrained ingredients. According to the present disclosure, a supply means is provided via which the feed pump may be optionally additionally connected with an external collecting vessel via the first channel. The operator may thus choose between two different operating modes with and without an external collecting vessel.

16 Claims, 9 Drawing Sheets

(51) Int. Cl.
*A22C 5/00* (2006.01)
*A22C 11/02* (2006.01)
*A23L 13/60* (2016.01)
*A23L 5/00* (2016.01)
*F04C 2/344* (2006.01)
*F04C 13/00* (2006.01)

(52) U.S. Cl.
CPC ........... *A23L 13/65* (2016.08); *A23V 2002/00* (2013.01); *F04C 2/344* (2013.01); *F04C 13/001* (2013.01); *F04C 2240/81* (2013.01)

(58) Field of Classification Search
CPC ......... A22C 11/06; A22C 11/08; A23L 13/60; A23L 5/00; F04C 2/344
USPC .......... 452/30–32, 40–42, 35–37, 46–48, 51, 452/21–26
See application file for complete search history.

(56) References Cited

U.S. PATENT DOCUMENTS

2014/0287666 A1* 9/2014 Baechtle ................ A22C 11/02
452/40
2016/0008856 A1* 1/2016 Maile ........................ B08B 9/00
452/35

FOREIGN PATENT DOCUMENTS

| EP | 1837524 A1 | 9/2007 |
|---|---|---|
| EP | 3081088 A1 | 10/2016 |
| JP | H05236863 A | 9/1993 |

* cited by examiner

FILLING MACHINE AND METHOD FOR FILLING UP LIQUID OR PASTY MASSES WITH EXTERNAL COLLECTING VESSEL

CROSS REFERENCE TO RELATED APPLICATIONS

This application claims priority to European Patent Application No. 16202200.8 entitled "FILLING MACHINE AND METHOD FOR FILLING UP LIQUID OR PASTY MASSES WITH EXETERNAL COLLECTING VESSEL," filed on Dec. 5, 2016, the entire contents of which are incorporated herein by reference for all purposes.

TECHNICAL FIELD

The present disclosure relates to a filling machine and a method for filling up liquid and pasty masses.

BACKGROUND

In food processing, with the aid of a filling machine, product to be filled up is ejected via a hopper and a feed mechanism, e. g. a vane pump, for example via a filling tube. To assist the supply, a vacuum pump is connected to the vane pump to evacuate the vane cells of the vane pump. Corresponding filling machines or vane pumps are shown, for example, in EP 1 044 612 and EP 1 837 524. In the vane pump, an evacuation opening is provided which is connected to the vacuum pump through several channels.

However, during the evacuation of the conveyor cells, ingredients of the product to be filled are sometimes entrained towards the vacuum pump. For this reason, an integrated collecting vessel is provided between the feed pump and the vacuum pump to collect entrained ingredients, such as, for example, pasty masses, suspended matter and liquids, and to condense vapours. During the cleaning of the vane pump, too, ingredients of the conveyed product to be filled, liquids, and deposits pass into the collecting vessel. Thus, the vacuum pump and an air filter inserted upstream thereof may be protected.

The collecting vessel must be emptied and cleaned at regular intervals to prevent harmful organisms from being spread and biological decomposition products from being formed. Moreover, it must be prevented that the mass collected in the collecting vessel exceeds a certain filling level, e.g., it must be prevented that the vacuum connection from the feed pump to the vacuum pump is interrupted (for example, if the collected mass completely fills the collecting vessel and already rises into the vacuum pipes, such that the vacuum pipes become clogged). Otherwise, an undesired pressure increase occurs in the vane cells. Moreover, the vacuum channel between the feed mechanism and the collecting vessel must be regularly cleaned.

The well-known filling machines, however, have the disadvantage that, if products having a relatively high condensate or liquid proportion are used, the conventional collecting vessels often have capacities that are too small. The quantity, size, and design of the integrated collecting vessel is given by the machine construction. If the produced type of product is temporarily changed, the volume of the collecting vessel may not be changed spontaneously. Moreover, the position and orientation of the collecting vessel is not variable.

Thus, the quality of separation of entrained ingredients, e. g. gaseous water vapour, is often not sufficient, so that undesired ingredients are entrained into the vacuum generator, and in particular vaporous media condense out in the vacuum generator. Thus, the vacuum generator may be damaged by the foreign matter, for example by oxidation of the components. Moreover, by the disadvantageous influence of an operating medium, the lubricating effect may not be sufficiently maintained, thus essentially reducing the service life of the vacuum generator.

Common protection mechanisms, such as float valves or filling level switches, often cause process interruptions due to the sucked up fluids and particles, thus affecting the production performance and process reliability. In case of a manual filling level control, this moreover requires the attention of the user as otherwise the vacuum pump is separated by the closure of the float valve and thus the process reliability is at risk.

Starting from this situation, the object underlying the present disclosure is to provide a device and a method permitting an efficient, safe, and inexpensive separation of varying amounts of liquid, gaseous and solid ingredients from the medium sucked up from the feed pump.

According to the present disclosure, the feed pump is connectable with the vacuum pump via a first channel branching off from the vacuum pump, via an integrated collecting vessel for entrained pasty or liquid ingredients. This integrated collecting vessel is arranged, for example, in or at the filling machine and provided as standard in the filling machine.

According to the present disclosure, a supply means, which also functions as a connections means, is provided via which the feed pump may be optionally additionally connected with an external collecting vessel exactly through this first channel that is connected with the feed pump. Thus, the vacuum pump may be protected from condensing, as well as liquid and solid ingredients of the sucked-up medium, in a reliable and advantageous manner. If the filling machine is, for example, used for goods to be filled where a large amount of ingredients is entrained towards the vacuum pump, for example warm products to be filled, such as soups etc., in addition to the internal collecting vessel, the external collecting vessel may also be connected. By the present disclosure, therefore, an improved service life of the filling machine and its components is achieved. The filling process with moist, warm, aqueous media benefits from a longer useful life of the system and an increased process reliability. Thus, downtimes and maintenance works may be considerably reduced. In particular, the soiling of the internally disposed channels and filter means as well as deposits in the vacuum pump may be prevented and corrosion as well as other chemical influences avoided. If an operating medium is used in the vacuum pump, the latter is protected from getting enriched with entrained ingredients.

Moreover, the external collecting vessel may compensate pressure surges if these are caused by the irregular supply of gases from the product to be filled. Simultaneously, the volume of the collecting vessel serves as a kind of vacuum storage such that a vacuum in the feed pump may be quickly built. The filling machine may thus be adapted, in a simple manner, to the amount of entrained volatile and solid ingredients determined by the type of the product to be filled.

By the external collecting vessel being arranged outside the machine housing and spaced apart from the machine housing, it is subjected to a lower ambient temperature than the integrated collecting vessel. Accordingly, the condensation of pumped off vapours in the collecting vessel is promoted.

Since the external collecting vessel is connected to the feed pump via a supply means and via the already existing first channel, it may be very easily integrated into the existing device.

According to at least one embodiment, the filling machine comprises a second channel which is located between the vacuum pump and the first channel, in particular between the collecting vessel and the first channel.

Here, the first channel and the second channel are arranged such that they may be connected via a connection element. This means that, via a correspondingly inserted connection element, the vacuum pump is evacuated via the two channels and the first collecting vessel. A corresponding configuration is sufficient if, for example, masses are filled which have, for example, a low temperature, are relatively solid and wherein fewer ingredients are entrained.

However, it is also possible to connect, as an alternative, the first channel, via a supply means, with a feed line to the external collecting vessel, and the second channel with the discharge line of the collecting vessel. A corresponding configuration is particularly suited for product to be filled which is, for example, warm and has a high proportion of liquid. Then, the vacuum pump is connected to the feed pump via the two collecting vessels. A corresponding arrangement is particularly advantageous as the existing channels may already be used for the insertion of the external collecting vessel. In this second mode, the external collecting vessel is located between the two channels.

Advantageously, the connection element and the supply means are exchangeable, e.g., at least partially exchangeable, so that the operator may retrofit the plant in a simple manner.

According to at least one embodiment, an inspection opening is connected to the collecting vessel via the second channel for inspecting the second channel and/or the collecting vessel. The inspection opening may be disposed in a lid of the feed pump or a swivelling housing at the lid, or in a machine housing, such that the second channel and/or the collecting vessel may be inspected through the inspection opening while the lid is closed. Here, the second channel may be oriented upwards or obliquely upwards. Through the inspection opening, the operator may check the channel and/or the collecting vessel for soiling. From above here means from a position above the vane pump or the machine housing, respectively. The channel also permits to clean the channel, if required, via the inspection opening without any complex measures being required. Advantageously, this second channel, which is anyway already provided in a filling machine for inspection purposes, may be used as return channel to the vacuum pump and as a connection channel to the external collecting vessel. Through this second channel, the sucked-up medium may then be guided out of the external collecting vessel towards the vacuum pump.

Advantageously, the supply means comprises a supply element with two separated supply channels, wherein one of these supply channels may be connected to the first channel and the other one to the second channel. The respective supply channels may then be permanently connected, at their opposite sides, with corresponding feed and discharge lines, or they may be connected via corresponding connections, for example plug connections.

According to at least one embodiment, the first and the second channels may end in the lower region of a recess, wherein the supply element of the supply means may be inserted into the recess to connect the first and second channels with a feed or discharge line of the collecting vessel, in particular via the supply channels. Here, the first and second channels ending in the recess may be separated from each other via a seal in a pressure-tight manner. Thus, the external collecting vessel may be connected in a simple manner. If one collecting vessel is sufficient, a connection element is used which may be, for example, shifted into the recess or seals the upper opening of the recess and seals the recess to the outside in such a way that the medium sucked up from the feed pump is directly pumped from the first channel towards the vacuum pump. If the external additional collecting vessel is to be used, the connection element is, for example, removed, the supply element is inserted into the recess or placed onto it, whereby, in a simple manner and without any major modification measures, the external collecting vessel may be integrated into the vacuum system.

According to at least one embodiment, the supply means comprises connections, in particular plug connections, which connect the feed and discharge lines to the external collecting vessel, in particular feed and discharge hoses, with the first and second channels in a pressure-tight manner. The plug connections may connect the first and the second channels e. g. also via the first and second supply channels in the supply element. However, it is also possible that the connections, in particular plug connections, directly connect the feed and discharge lines with the channels.

To increase the separating power, according to the present disclosure, at least one of the following means may be provided for the external collecting vessel:

a. means for diverting the supplied gas, in particular a tangential inlet.

Here, the collecting vessel may be, for example, embodied as a tangential or axial cyclone precipitator for separating the light gas from the heavy liquid and solid ingredients. However, the use of demisters, e.g., the precipitation of fine droplets and particles, for example at grids, a wire or braided filters or membranes, also increases the function of the precipitators. The sucked-up medium may also be guided through a liquid bath, for example in the lower region of the container. This bath takes up supplied particles, so that these sediment on the bottom of the collecting vessel and are not taken along with the flow.

A cooling means at the collecting vessel also increases the condensation of entrained ingredients. Container surfaces having a good thermal conductivity, in particular stainless special steels, are particularly advantageous. Moreover, the feed line to the collecting vessel may be already cooled. Suited for cooling the lines and/or the collecting vessel are, for example, fans, heat exchangers disposed at the lines or at the container surface, wherein cooling water, ice water, liquefied gases (nitrogen etc.) may be used as cooling medium. Surface enlargement in the collecting vessel or cooling ribs etc. are also possible. Another possibility of cooling the medium is isotropic expansion and the acceleration of the medium to ultrasonic speed using a Laval nozzle.

Advantageously, the filling machine may comprise means for automatically emptying the collecting vessel comprising in particular a filling level sensor in the external collecting vessel and/or in the integrated collecting vessel, and in particular a flap and an aeration valve for aerating the external collecting vessel. Thus, if it is for example detected that the filling level in the external or first collecting vessel exceeds a certain filling level, an emptying operation may be automatically performed. For this, the external collecting vessel is aerated via an aeration valve, such that the pressure is not lower than ambient pressure. Via a mechanism, a flap in the lower region of the collecting vessel may then be automatically opened for drainage.

In at least one example, it is particularly advantageous if the filling level sensor is used in the first collecting vessel since a corresponding sensor is already provided as standard anyway. If it is determined that a predetermined limiting value has already been exceeded in the first collecting vessel, one may assume that the external collecting vessel must be emptied. Thus, an already existing sensor system may be used without an additional sensor having to be provided in the external collecting vessel. This involves the advantage that the additional external collecting vessel may be easily integrated in the filling machine just by connecting it via corresponding feed and discharge lines. It is also possible that, if the filling level sensor determines in the first collecting vessel that a certain limiting value has been exceeded, a warning signal is emitted and aeration is effected automatically or manually, and the flap is opened manually to empty the external collecting vessel. For this, the machine either stops automatically or may be stopped in advance.

According to at least one example method for operating the filling machine, an operating mode may be selected for the filling machine to generate a vacuum in a feed pump by a vacuum pump. If the operator fills up a product to be filled, e. g. a pasty mass, where, according to experience, only few ingredients are entrained towards the vacuum pump, the operator selects a first operating mode where an evacuation opening of the feed pump is connected, via a first channel, to a collecting vessel for entrained ingredients. If an operator determines that the collecting vessel integrated in the filling machine is not sufficient, he will select the second operating mode where the evacuation opening of the feed pump is additionally connected to an external collecting vessel via the first channel.

Here, for selecting the first operating mode, the first channel connected with an evacuation opening in the feed pump is connected with a second channel, where the second channel is situated between the vacuum pump and the first channel, in particular between the collecting vessel and the first channel. In case of the selection of the second operating mode, the first channel is connected with a feed line to the external collecting vessel, and the second channel is connected with the discharge line of the external collecting vessel. Thus, the external collecting vessel may be effectively integrated into the vacuum system without any complex and time-consuming reset works being required. In the first operating mode, an exchangeable connection element may be provided which connects the first and second channels. In the second operating mode, an exchangeable supply means may be provided to connect the feed pump with the vacuum pump via the collecting vessel and the external collecting vessel.

Advantageously, in the second operating mode, the collecting vessel and the external collecting vessel may be arranged in series. Here, the pumped-up mixture of substances may first pass through the external collecting vessel and then through the collecting vessel, or the pumped-up mixture of substances may first pass through the collecting vessel and then through the external collecting vessel before it reaches the vacuum pump.

Advantageously, a filling level control may be performed in the collecting vessel, where, in case a certain filling level is exceeded, the filling machine is switched off. Then, the external and/or integrated collecting vessel may be emptied either automatically or manually.

According to another exemplified embodiment of the present disclosure, the first and second channels end in a collecting vessel arranged at the filling machine and may be in particular designed as a bell. In a first operating mode, the pumped-up medium is guided through the first channel, the integrated collecting vessel and the second channel towards the vacuum pump. That means that the collecting vessel, e.g., the bell, is disposed between the first and second channels. In a second operating mode, the pumped-up medium from the first channel is connected, either via the first collecting vessel or directly with a feed line to the external collecting vessel, and the discharge of the external collecting vessel is connected, directly or via the collecting vessel, with the second channel, e.g., the first and second channels may be interconnected via the external collecting vessel, wherein the integrated collecting vessel, in particular the bell and the external collecting vessel, may be arranged between the first channel and the second channel. Here, the integrated collecting vessel, e.g., the bell in which the corresponding supply means is integrated, may be exchanged for selecting the operating mode in a simple manner.

BRIEF DESCRIPTION OF FIGURES

The present disclosure will be illustrated below in greater detail with reference to the following figures:

FIG. 5ab shows a first example of the device shown in FIG. 4 in the first operating mode.

DETAILED DESCRIPTION

FIGS. 1-8 show the relative positioning of various components of the safety closure and container. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
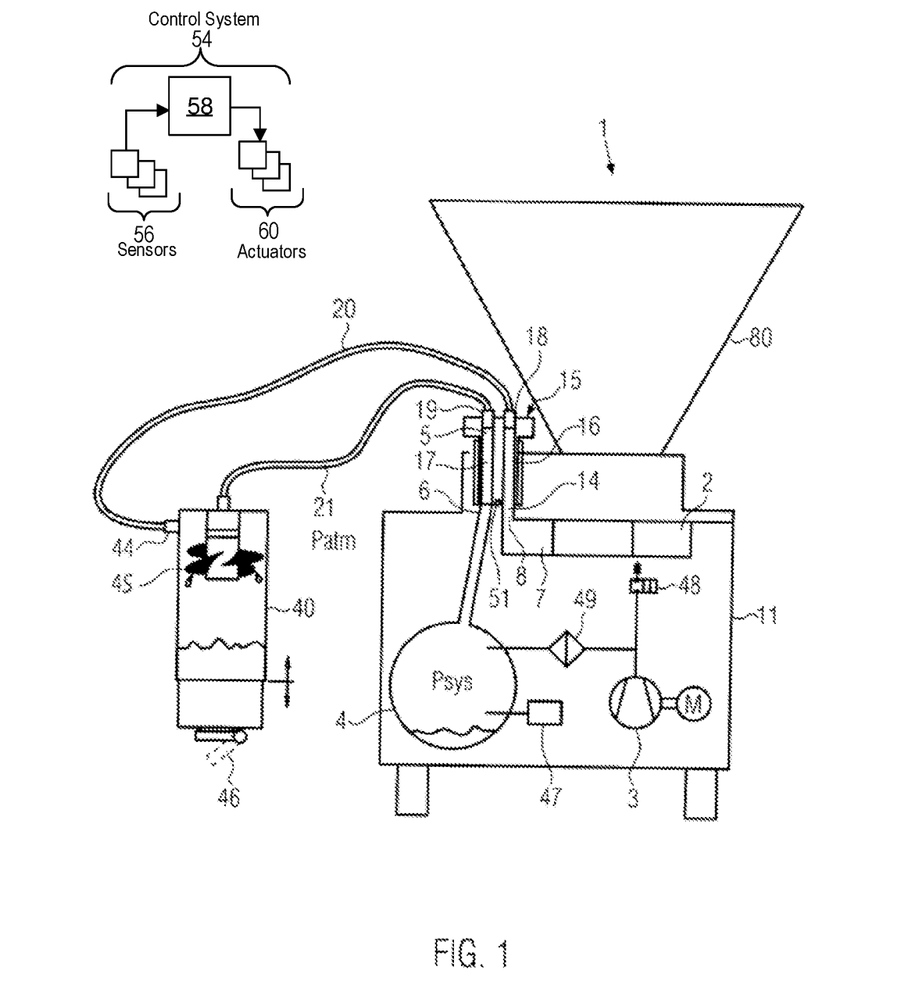
FIG. 1 schematically shows a longitudinal section through a filling machine in the second operating mode according to at least one embodiment of the present disclosure.

FIG. 1 roughly schematically shows a section through a filling machine according to the present disclosure. The filling machine 1 comprises a hopper 80 for receiving pasty mass. This hopper 80 is e. g. arranged on a swivelling housing 10, such that the swivelling housing, including a lid 9 of a vane pump 2, may be swivelled for opening the vane pump 2. The vane pump 2 is disposed underneath the hopper. The present disclosure will be described in connection with a vane pump, however, the present disclosure is equally suited for other feed pumps, such as a gerotor, a gear pump, a reciprocating pump, a rotary piston pump, a twin screw or individual feed screw, where the product to be filled is evacuated via an evacuation opening. The filling machine 1 furthermore e. g. comprises a non-depicted filling tube 19. The pasty mass may be pushed into the filling tube 19 through the vane pump 2 and ejected into sausage casings in a well-known manner. The filling machine furthermore comprises a machine housing 11 in which the vane pump 2 is arranged. In this exemplified embodiment, a vane pump is, for example, employed where an inlet for product to be filled is first followed, in the sense of rotation of the vane pump, by a pressure region in which the volumes of the vane cells 7 are decreased. This pressure region ends in an outlet for the product to be filled leading to a non-depicted outlet tube. Seen in the sense of rotation, the outlet for the product to be filled is followed by a sealing region in which the exterior surface of the rotor comes into direct contact with the inner wall of a pump housing. The sealing region is followed by the vacuum and suction region reaching to the inlet for the product to be filled. In this vacuum or suction region, a vacuum is generated which facilitates the filling in of the pasty mass and takes care that as much air as possible may be withdrawn from the pasty mass. To evacuate the vane cells, the evacuation opening 8 is provided via which, with the aid of a vacuum pump 3, the vane cells 7 may be evacuated, i.e. the pressure in the vane cells may be reduced. A first channel 14 is connected to the evacuation opening 8, and a second channel 6 ends in a collecting vessel for entrained ingredients integrated in the filling machine. The entrained ingredients may be collected and gathered in the collecting vessel 4. Thus, the vacuum pump 3 and an optionally provided filter 49 may be effectively protected. The sucked-up medium from the feed pump 2, also referred to herein as a vane pump, is e. g. a one-phase or multi-phase fluid, e. g. air enriched with water vapour. Optionally, ingredients of the product to be filled are contained in the sucked-up mixture of substances in a solid and in a liquid form, e. g. pasty mass, liquids etc.

Figure 2:
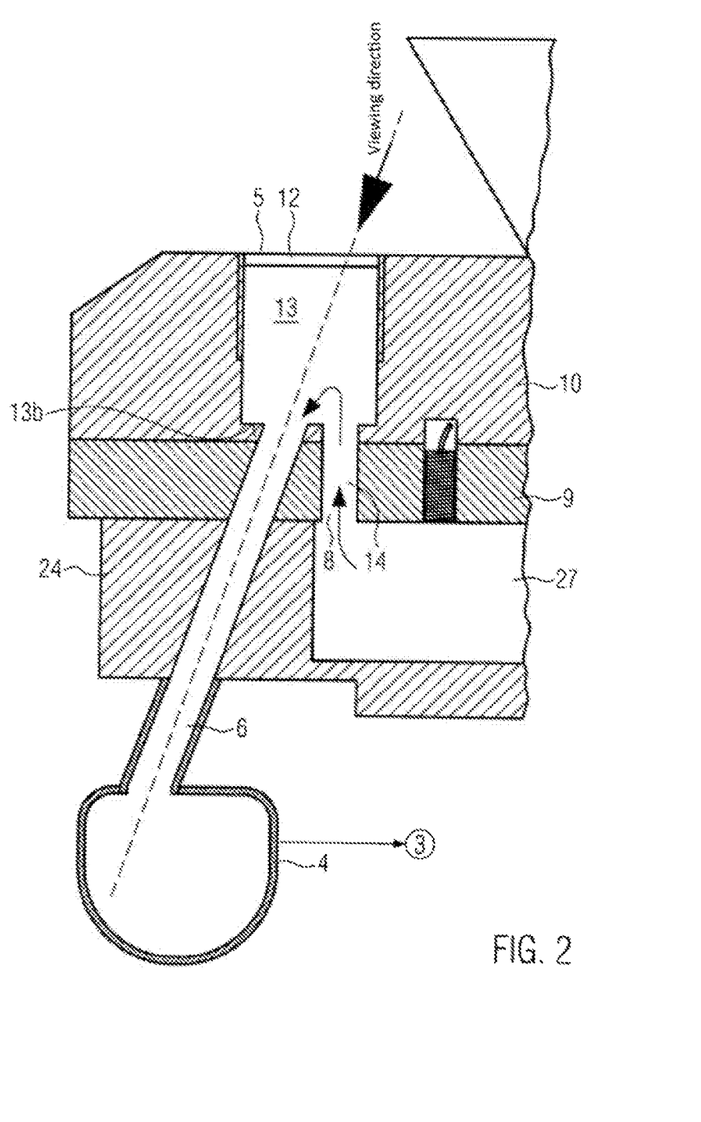
FIG. 2 schematically shows a longitudinal section through a part of a filling machine according to at least one embodiment of the present disclosure in a first operating mode.
Figure 3:
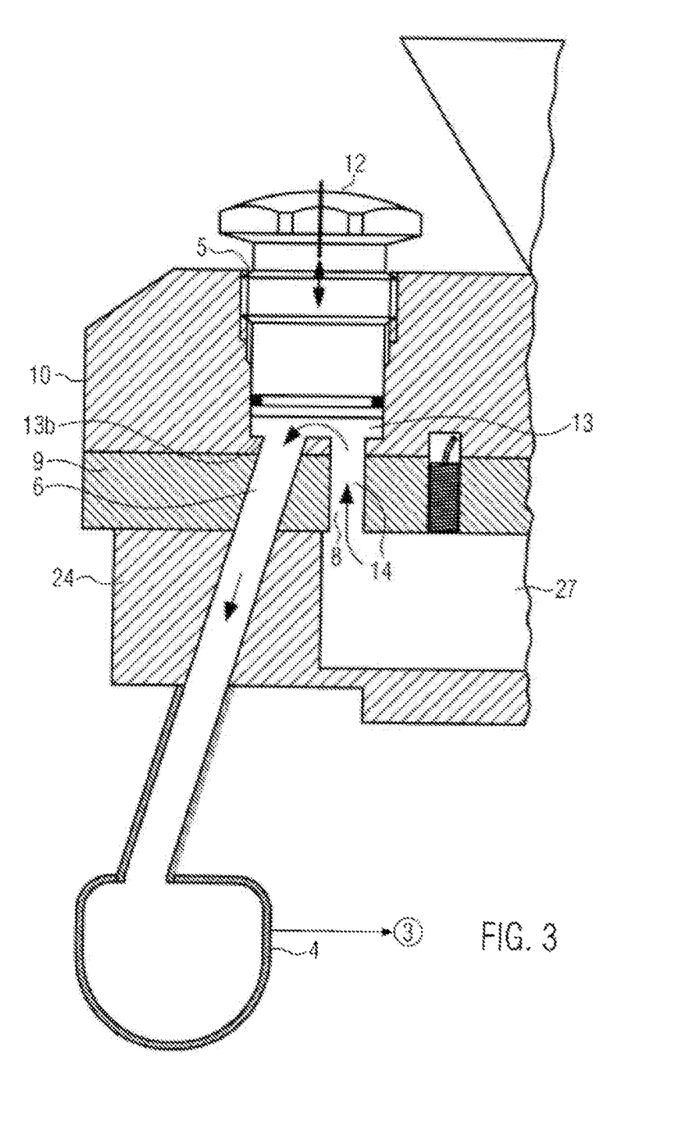
FIG. 3 shows a longitudinal section through a part of a filling machine according to a further embodiment according to at least one embodiment of the present disclosure in a first operating mode.

As can be taken from FIGS. 1 to 3, according to the present disclosure, an inspection opening 5 may now be provided which is connected with the internal collecting vessel 4 via the channel 6 for inspecting the channel and/or the collecting vessel 4. As can be taken from FIG. 2, the interior of the channel 6 may be inspected via the inspection opening 5, the visibility being given by the channel to the collecting vessel. Thus, one can see in a simple manner whether there are any impurities in the channel and whether the channel 6 is clogged, or whether the collecting vessel is too full. To ensure visibility, the channel should essentially extend straightly, in particular at an angle of 0 to 15° to the vertical longitudinal axis of the filling machine. In the embodiments shown in FIGS. 1 to 3, 27 schematically shows the chamber or the interior of the vane pump which is here closed by the lid 9. The swivelling housing 10 is disposed above the lid. The inspection opening 5, here facing upwards, is provided in the swivelling housing 10. The inspection opening 5 is here provided in the upper region of a recess 13, which is e. g. formed in the swivelling housing. The recess 13 could also extend into the lid 9. The channel 6 here extends from the collecting vessel 4 through the housing wall 24 of the vane pump, the lid 9, and ends in the lower region 13b of the recess 13. The recess 13 may be, for example, designed hollow-cylindrically, but is not restricted to this shape.

The evacuation opening 8 is here not provided in the side wall but in the lid. A first channel 14 extends from the evacuation opening 8 to the recess 13 and also ends in the lower region. In FIG. 2, the recess 13 is closed in a pressure-tight manner via a closing element 12, for example also a transparent closing element. This means that the channel 6 is connected, via the recess 13 and the channel 14, with the vane cell or the vane pump via the opening 8. FIG. 3 shows another closing element 12 in which the inspection opening may also be closed. The closing element is here embodied as an axially movable piston 12. The axially movable closing piston is also embodied as a vacuum closure and closes the opening 5. In the position shown in FIG. 3, here, too, the vane pump may be evacuated through the evacuation opening 8 via the channel 14, the recess 13, and the channel 6. The axially movable closing piston 12 may be, for example, moved up and down in the recess 13 manually. If the piston 12 is moved still further downwards into its lowermost position, it may either close the channel 6 and/or the channel 14 which both end in the recess 13, i. e. separate the channel 6 from the channel 14.

The arrangement shown in FIGS. 2 and 3 with a closing element 12 permits the operation of the filling machine in a first operating mode exclusively with the internal collecting vessel 4. If the filling machine is now used for another product to be filled, where it is expected that many ingredients are entrained towards the vacuum pump, it is easily possible to retrofit the existing filling machine for a corresponding product to be filled. Here, instead of the closing element 12, a supply means 15 is used via which the feed pump 2 may be additionally connected with an external collecting vessel 40 via the first channel 14, as is shown in FIG. 1. In this concrete exemplified embodiment, the supply means 15 comprises, for example, a supply element 50 having such an outer contour that it may be inserted into the recess 13. The supply element is inserted down to the bottom 13b of the recess 13 and comprises two supply channels 16, 17 which extend through the supply element 50, wherein a supply channel 16 follows the channel 14 in a pressure-tight manner, and the channel 17 follows the second channel 6 in a pressure-tight manner, such that the channels 14 and 6 are separated from each other via a sealing means 51 in a pressure-tight manner. The supply means also has, in the upper region, two connections 18, 19, e. g. plug connections, via which the supply means 15 may be connected with a feed line 20 and a discharge line 21 of an external collecting vessel 40. In a very simple manner, the feed and discharge lines are embodied as flexible hoses, so that the external collecting vessel 40 may be positioned in any desired way. Optionally, the filling machine comprises a mobile mounting in which the collecting vessel 40 is received. The supply and discharge lines 20, 21 may already be fixed in or plugged into the supply element 50 of the supply means 15. Thus, air may be pumped out of the feed pump 2 through the evacuation opening 8, the first channel 14, the supply channel 16, the feed line 20, the external collecting vessel 40, the discharge line 21, the outlet channel 17, the second channel 6 and the internal collecting vessel 4 and the line 60 through the vacuum pump 3. Due to the external collecting vessel 40, the available volume of the precipitation vessels is essentially increased.

The individual connections of the respective components are sealed towards the outside. The external collecting vessel 40 has, for example, a volume within a range of 2 l to 50 l, while the internal collecting vessel has a volume of 0.5 l to 10 l. The external collecting vessel may have, in general, a larger volume than the internal collecting vessel. An additional vessel serves to absorb pressure surges and for a quick pressure compensation. Since the external container 40 is located outside the machine or the machine housing 11, it is subjected to a lower temperature than the internal vessel 4, such that liquid may condense out earlier.

The filling machine may also comprise means for increasing the separating power of the external collecting vessel. For example, the external collecting vessel 40 may comprise means for diverting the supplied gas. For this, a tangentially arranged inlet 44 may be provided, for example, for the sucked-up medium, such that the introduced medium is caused to rotate. In case of rotating air columns, tangential flow speeds that decrease from the outside to the inside occur in the vessel, whereby the heavy particles reach the wall and may be guided downwards along the same and collected. In addition or as an alternative, guide vanes 45 may be provided, for example, which are also suited to divert the inflowing medium or gas or to cause it to rotate.

Condensation is also promoted by the collecting vessel 40 being made of a material having good thermal conductivity, in particular of stainless special steels. Advantageously, a cooling means is also provided which cools the walls of the collecting vessel 40 or condensation elements installed therein, for example by integrated heat exchangers, wherein a corresponding thermal medium is guided through these heat exchangers for taking up the condensation heat. As a thermal medium, for example cooling water, ice water, liquefied gas (e. g. nitrogen) is used. A provided fan may also serve to cool the collecting vessel 40. Furthermore, for example cooling ribs or means for enlarging the surface to promote condensation may be provided in the collecting vessel. Another possibility of cooling the medium is isotropic expansion and the acceleration of the medium to ultrasonic speed using a Laval nozzle.

Furthermore, the filling machine comprises a filling level sensor 47, e. g. a level switch 47. If it is detected that the filling level in the collecting vessel 4 reaches a certain filling level, the filling machine is switched off, for example. One may assume that the external collecting vessel 40, too, is full and must be emptied. Advantageously, the use of the internal automatic switch-off system already existing in the filling machine 1 is particularly advantageous for a high or overfull filling level in the collecting vessel 4. An indication in a display may be shown which indicates that a cleaning of the collecting vessel 40 and/or 4 is necessary, or drainage is initiated automatically.

In at least one example, filling level sensor 47 may be a part of control system 54 of the filling machine, where control system 54 comprises sensors 56, a controller 58, and actuators 60. One or more of the sensors 56 may provide an output to controller 58, and after receiving the output from the one or more sensors 56, the controller 58 may actuate one or more of actuators 60. Put another way, controller 58 may be triggered to actuate one or more of actuators 60 responsive to receiving an output from one or more of sensors 56. Controller 58 may comprise non-transitory instructions executable by a processor that cause the controller to control one or more of actuators 60 responsive to receiving an output from one or more of sensors 56.

In one or more examples, filling level sensor 47 may be a sensor of sensors 56. Filling level sensor 47 may provide an output to controller 58 indicating that collecting vessel 4 has reached or is greater than a threshold level. The threshold level may be a predetermined level at which the collecting vessel 4 may need to be emptied to avoid an overfilling of the collecting vessel 4. Controller 58, after receiving the output from filling level sensor 47 that the collecting vessel 4 has reached the threshold level, may actuate one or more of actuators 60.

In at least one example, actuators 60 may comprise one or more of a flap actuator of flap 46, the automatic switch-off system, and a display of the filling machine. Thus, in at least one example, the controller 58 may actuate an actuator of flap 46 responsive to receiving an output from filling level sensor 47 indicating that collecting vessel 4 has reached or is greater than the threshold level. Thus, the filling machine may be quickly drained. Additionally or alternatively, controller 58 may control automatic switch-off system to turn off the filling machine responsive to receiving the output from the filling level sensor 47 indicating that collecting vessel 4 has reached or is greater than the threshold level. Therefore, overfilling of collecting vessel 4 may be avoided.

Furthermore, controller 58 may additionally or alternatively provide a display via the display of the filling machine responsive to receiving the output from the filling level sensor 47 indicating that collecting vessel 4 has reached or is greater than the threshold level. In at least one example, the indication displayed via the display of the filling machine may indicate that a cleaning of the collecting vessel 40 and/or 4 is necessary.

The drainage of the external collecting vessel 4 may be effected automatically. Here, for example, the vacuum system is aerated via a valve 48, such that no more vacuum prevails in the collecting vessel 40. In at least one embodiment, valve 48 may be actuated via controller 58 responsive to the controller 58 receiving an output from one or more sensors 56, such as filling level sensor 47. For example, controller 58 may actuate valve 48 in addition or alternatively to the above-discussed actuators responsive to receiving an output from the filling level sensor 47 indicating that collecting vessel 4 has reached or is greater than the threshold level. Then, the flap 46 is opened automatically and the collecting vessel 40 is emptied. Upon emptying, the valve 48 is automatically closed, and the flap 46 is also automatically or manually closed again. However, it is also possible to actuate the flap 46 manually. That means, drainage may be effected when a certain filling level is detected by the filling level sensor 47. Moreover, drainage may be effected in a filling break or purposefully after certain intervals, or after a certain number of produced portions.

Figure 4:
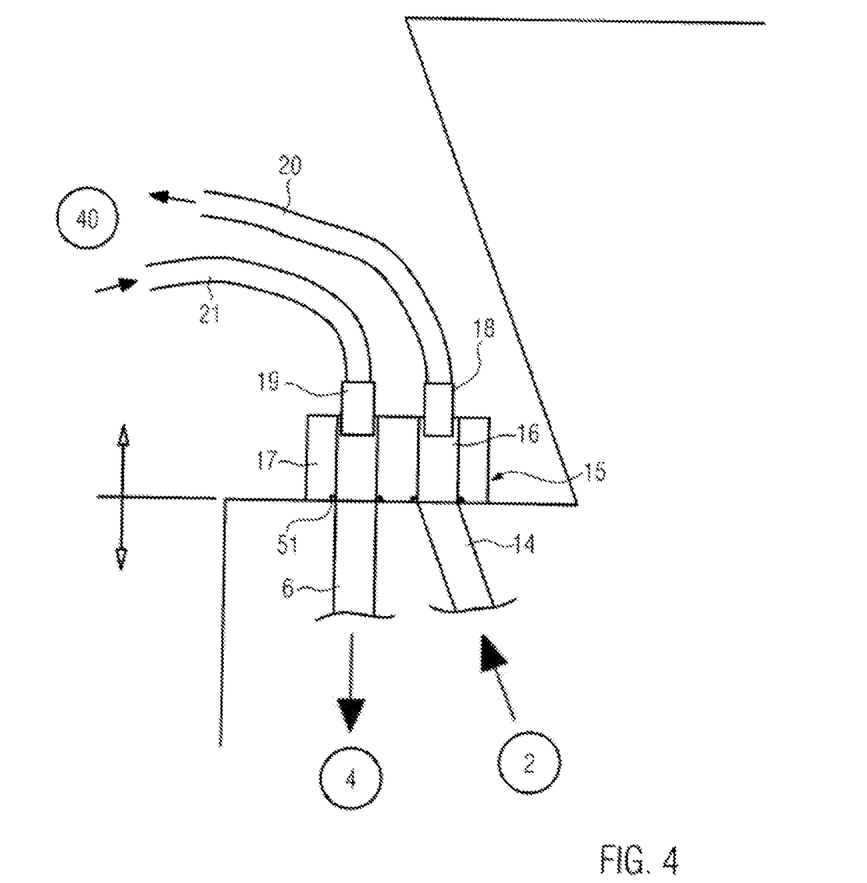
FIG. 4 schematically shows a longitudinal section through a part of a filling machine in the second operating mode according to at least one embodiment of the disclosure.

FIG. 4 shows a further embodiment according to the present disclosure with the first channel 14, the second channel 6, the supply means 15 here again comprising two pressure-tight plug connections 18, 19 which are here plugged into a supply element 50. The supply element 50 comprises a supply channel 16 and 17 which extend through the supply element 50 and follow, in a pressure-tight manner, the first and second channels 14, 6 via seals 51. The plug connections connect the supply channels 16, 17 with the feed and discharge lines 20, 21. The feed and discharge lines 20, 21 may also be permanently integrated in the supply means 15 or its supply element 50.

FIG. 4 shows the filling machine, here in a second operating mode, wherein additionally, an external water separator 40 is used. To now use the filling machine in the first operating mode, the plug connections 18, 19 may be removed, for example, and a connection element 12 plugged into the supply channels 16, 17, such that medium is guided, via the channel 14 and without any intermediate external water separator 40, into the channel 6, as is shown, for example, in FIG. 5a.

Figure 5A:
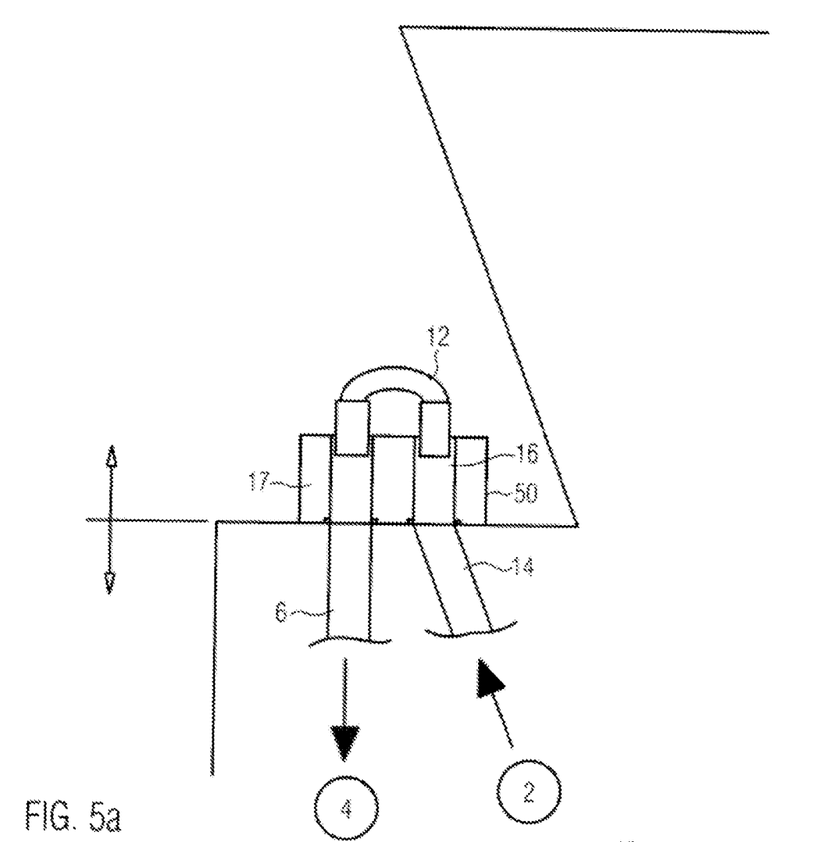
Figure 5B:
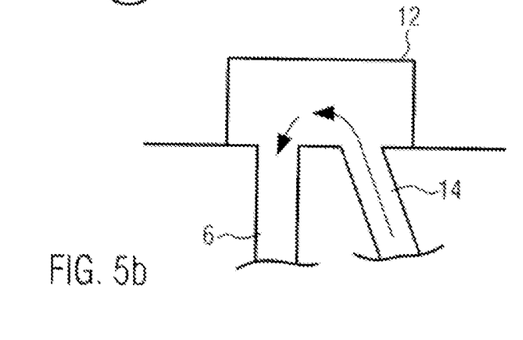
FIG. 5b shows a second example of the device of FIG. 4 in the first operating mode.

As is represented in FIG. 5b, however, the supply element 50 may also be replaced by a connection element 12 which also permits the flow of the pumped-up medium through the first channel 14 directly to the second channel 6 via the interior of the connection element 12.

Figure 6:
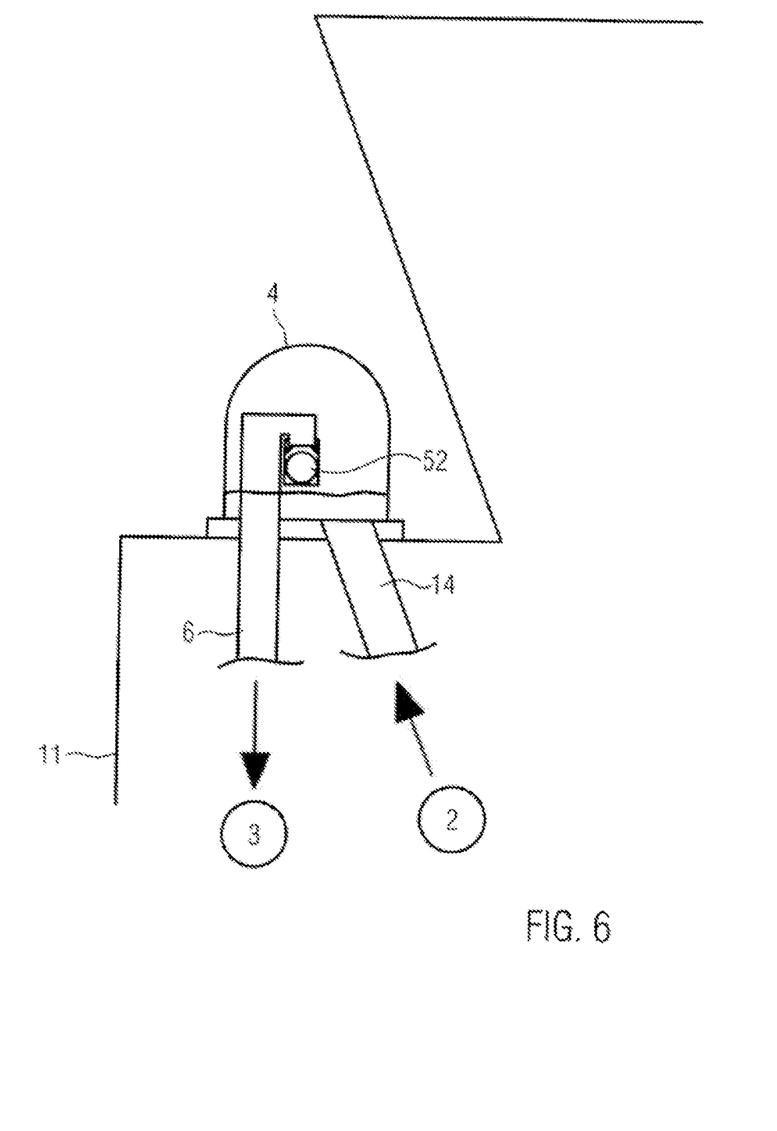
FIG. 6 schematically shows a longitudinal section through a part of a filling machine according to at least one exemplified embodiment in the first operating mode.

FIG. 6 shows another embodiment according to the present disclosure which essentially corresponds to the exemplified embodiment as it is shown in FIG. 1, with the exception that the integrated collecting vessel 4 is disposed at the machine housing, i. e. at the outer side of the machine housing 11, in a pressure-tight manner. Here, the collecting vessel 4 is embodied as a bell, e. g. a glass or plastic bell, the channels 14, 6 ending in the collecting vessel 4. Thus, the ingredients of the medium sucked up from the feed pump 2 may collect in the collecting vessel, as was also described in connection with FIG. 1. The channel 6 ends in an upper region of the collecting vessel and comprises, for example, a float valve 52 which prevents the separated medium from reaching the channel 6. FIG. 6 shows the filling machine, here in a first operating mode, wherein only the integrated collecting vessel 4 is used.

Figure 7:
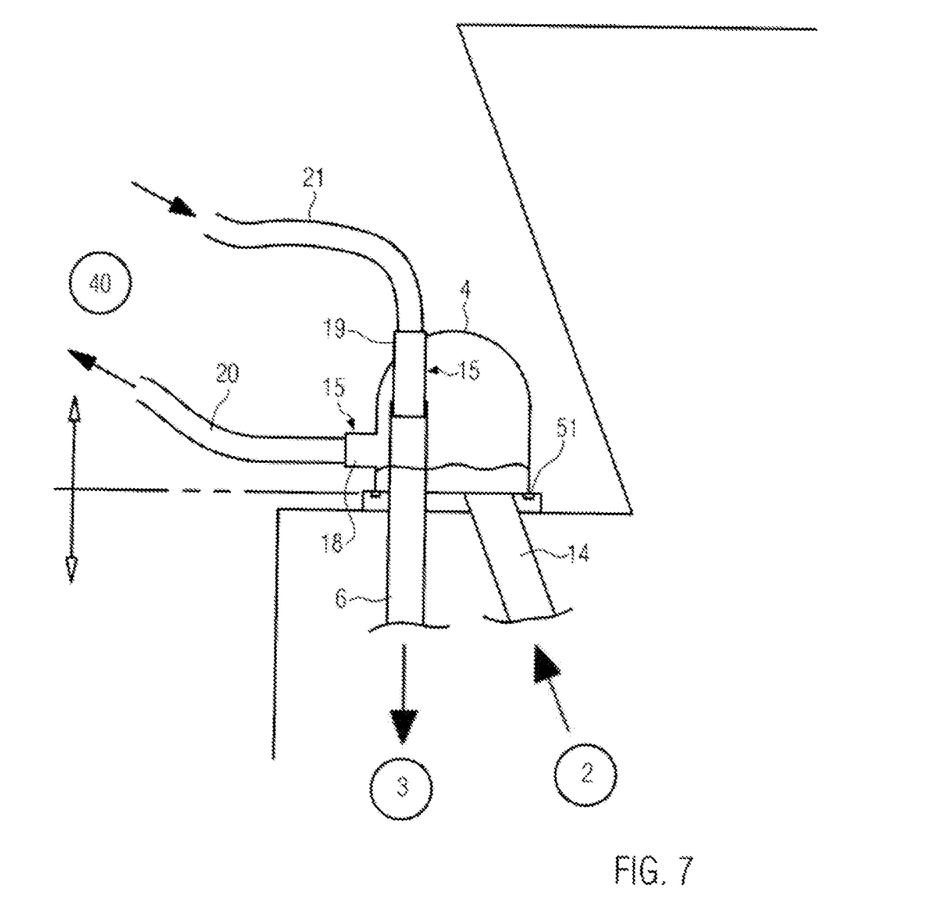
FIG. 7 shows an exemplified embodiment according to at least one example of the present disclosure corresponding to FIGS. 5a and 5b in the second operating mode with an external collecting vessel.

For a second operating mode, as it is shown in FIG. 7, the bell 4 arranged in a pressure-tight manner, for example by the seal 51, may be replaced by another bell. While the bell 4 in FIG. 6 also serves as a connection means between the first and the second channels 14, 6, the bell 4 in the second operating mode in FIG. 7 is designed such that the first channel 14 is connected to the feed line 20 of the external collecting vessel 40 via a supply means 15, wherein the feed line 20 may be permanently integrated in the supply means 15, or it may be embodied, as described above, as a sealing plug connection. The supply means 15 is thus integrated as a supply for the feed line into the collecting vessel, that means in the bell 4 itself.

The channel 6 is also, just as in the preceding exemplified embodiments, connected, via the connection means, with the discharge line 21 of the collecting vessel 40, the discharge line 21 being here, for example, plugged into the channel 6 via a plug connection 19 in a pressure-tight manner and guided through the collecting vessel 4 or the bell 4 to the outside. Here, too, the collecting vessel 4 is arranged tightly at the outside of the filling machine via a seal, e. g. a ring seal 51.

Figure 8:
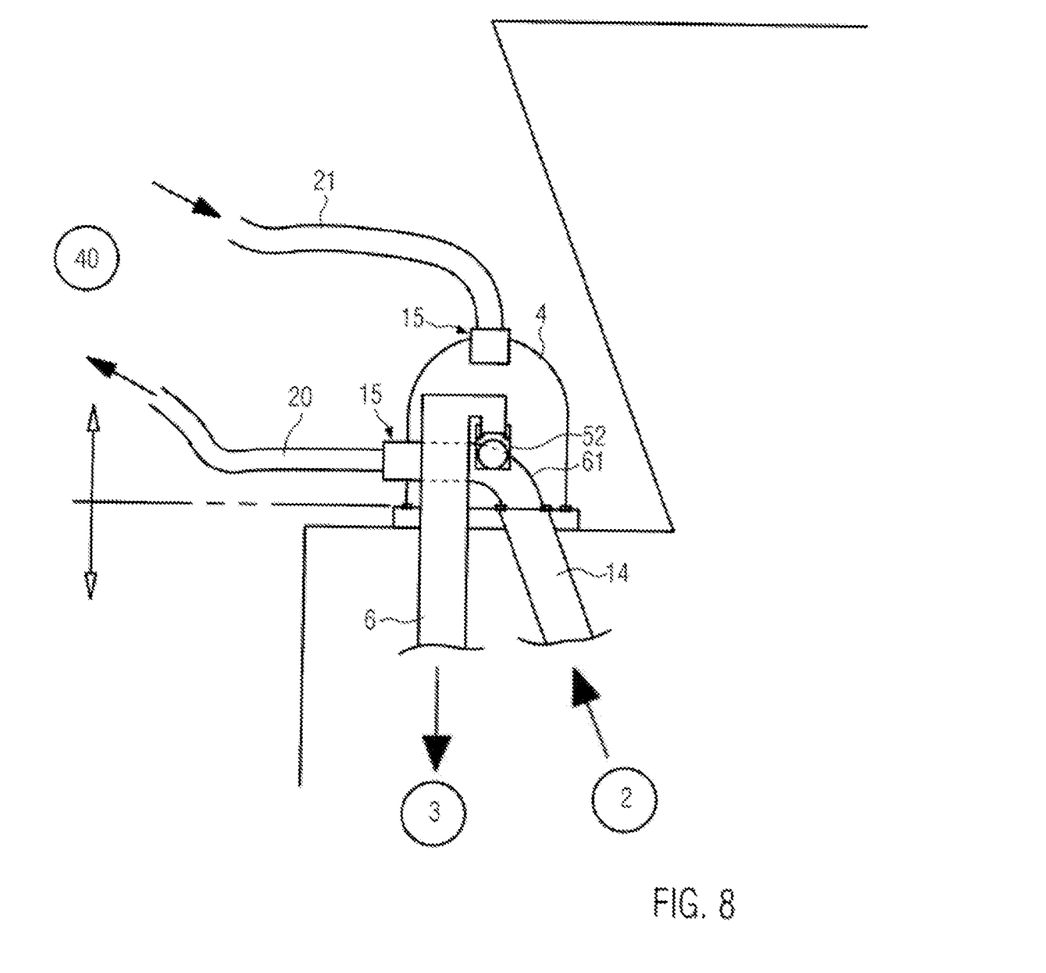
FIG. 8 shows a longitudinal section through a further exemplified embodiment according to at least one example of the present disclosure in a second operating mode.

FIG. 8, just as FIG. 7, corresponds to the second operating mode, with the exception that here, the first channel 14 is connected with a line section 61 of the supply means 15 in a pressure-tight manner, the line section 61 extending within the collecting vessel 4, i. e. within the bell 4, to the outside and there being connected with the feed line 20 to the external collecting vessel 40, i. e. the first channel 14 is extended through the collecting vessel 4 to the feed line 20 in a pressure-tight manner. The discharge line 21 of the external collecting vessel 40 is then, via the supply means 15, connected with the collecting vessel 4 either permanently or via a sealing plug connection. A float valve 52 is arranged also at the end of the second channel, as is shown in FIG. 6. Here, too, the collecting vessel 4 with the corresponding supply means 15 may be easily exchanged for selecting the operating mode.

It is essential in all exemplified embodiments that existing first and second channels, i. e. a first channel 14 connected with an evacuation opening 8, and a second channel 6, both extending at least partially within the filling machine and comprising an opening facing outwards with respect to the machine housing, are either directly connected to each other, or are connected, via an external collecting vessel, with corresponding feed and discharge lines. Thus, a filling machine produced in series may be easily retrofitted with an integrated collecting vessel 4 included as standard.

In the method according to the present disclosure, one of two possible operating modes is selected. In a first operating mode, an evacuation opening 8 of the feed pump 2 is connected, via a first channel 14, with a collecting vessel 4 for entrained ingredients, and in a second operating mode, the evacuation opening 8 of the feed pump 2 is additionally connected with an external collecting vessel 40 via the first channel. To select the first operating mode, the first channel connected with an evacuation opening in the feed pump 2 is connected with a second channel 6 situated between the vacuum pump 3, in particular between the collecting vessel 4 and the first channel 14. To select the second operating mode, the first channel is connected with a supply line to the external collecting vessel 40, and the second channel is connected with the discharge line of the external collecting vessel 40.

Figure 9:
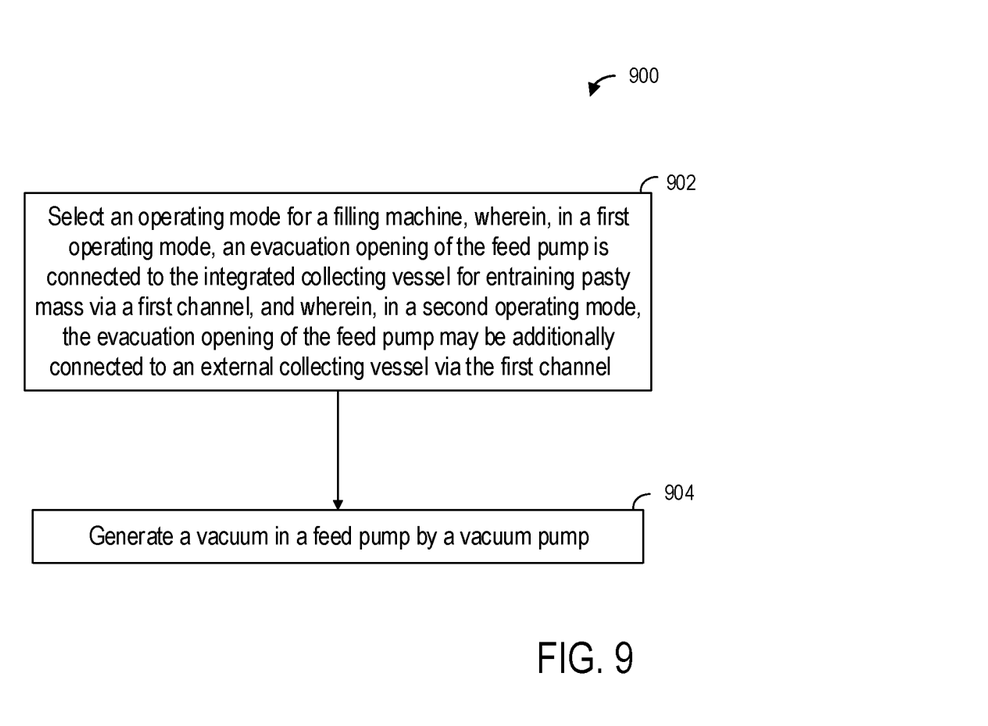
FIG. 9 shows a flow chart of an example method according to at least one embodiment of the present disclosure.

Turning now to FIG. 9, FIG. 9 shows a flow chart of an example method 900 according to at least one embodiment of the present disclosure. Method 900 may be carried out with a device such as filling machine 100, for example. For example, the filling machine may be for filling up liquid or pasty mass (e.g., in sausage production). The filling machine may comprise a feed pump for conveying said mass, and a vacuum pump for generating a vacuum in the feed pump. The feed pump may be connectable with the vacuum pump via a first channel and via an integrated collecting vessel for entrained ingredients. The filling machine may additionally include a supply means, wherein the feed pump is connectable to the supply means and to an external collecting vessel via the first channel.

Method 900 may begin at step 902, where step 902 comprises selecting an operating mode for the filling machine. The operating modes may include a first operating mode and a second operating mode, for example. In at least one example, in the first operating mode, an evacuation opening of the feed pump is connected to the integrated collecting vessel for entraining pasty mass via a first channel.

In the second operating mode, the evacuation opening of the feed pump may be additionally connected to an external collecting vessel via the first channel.

In at least one example, for selecting the first operating mode, the first channel may be connected with the evacuation opening in the feed pump and may be connected with a second channel, the second channel located between the vacuum pump and the first channel, and the second channel also located between the collecting vessel and the first channel. Further, in one or more embodiments, for selecting the second operating mode, the first channel may connected with a feed line to the external collecting vessel, and the second channel may be connected with a discharge line of the external collecting vessel.

In one or more embodiments, in a second operating mode, the integrated collecting vessel and the external collecting vessel may be arranged in series. Additionally, in some examples, either a pumped-up fluid first passes through the external collecting vessel and then through the collecting vessel, or the pumped-up fluid passes first through the collecting vessel and then through the external collecting vessel before it reaches the vacuum pump.

Following step 902, method 900 may comprise generating the vacuum in the feed pump by the vacuum pump at step 904.

In some examples, a filling level control may be performed in the collecting vessel, wherein, if a certain filling level is exceeded, the filling machine may be stopped or a warning signal may be emitted.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A filling machine for filling up a liquid or a pasty mass for sausage production, comprising:
   a feed pump that is a vane pump for conveying said mass,
   a vacuum pump for generating a vacuum in the feed pump, wherein generating the vacuum in the feed pump includes generating the vacuum in vane cells of the vane pump, wherein the feed pump is connectable with the vacuum pump via a first channel and via an integrated collecting vessel for entrained ingredients, and
   a connection means via which the feed pump and an external collecting vessel are connectable to each other via the first channel.

2. The filling machine according to claim 1, wherein the filling machine comprises a second channel located between the vacuum pump and the first channel,
   wherein the first channel and the second channel are arranged such that they are connectable with each other via a connection element, and
   wherein the connection means connects the first channel with a feed line to the external collecting vessel and wherein the connection means further connects the second channel with the discharge line of the collecting vessel.

3. The filling machine according to claim 2, wherein the first channel and the second channel end in a lower region of a recess, a supply element of the connection means being inserted into the recess to connect the first and the second channels with a feed and/or discharge line of an external collecting vessel.

4. The filling machine according to claim 3, wherein the connection means comprises connections that connect the feed and discharge lines with the first and second channels in the supply element.

5. The filling machine according to claim 4, wherein the connections are plug connections.

6. The filling machine according to claim 4, wherein the feed and discharge lines are feed and discharge hoses.

7. The filling machine according to claim 1, wherein a connection element and/or the connection means are at least partially exchangeable.

8. The filling machine according to claim 1, wherein an inspection opening is connected with the collecting vessel via the second channel for inspecting the second channel and/or the collecting vessel,
   wherein the inspection opening is disposed in a lid of the feed pump, or a swivelling housing at which the lid is arranged, or in a machine housing, such that the second channel and/or the collecting vessel may be inspected through the inspection opening while the lid is closed.

9. The filling machine according to claim 1, wherein the connection means comprises a supply element with two separate supply channels, a first supply channel being connectable with the first channel and a second supply channel being connectable with the second channel.

10. The filling machine according to claim 1, wherein the filling machine comprises at least one means for increasing a separating power out of the following group:
    means for diverting the supplied gas via a tangential inlet, a demister, a Laval nozzle, a liquid bath through which the supplied gas is guided, a cooling means for the collecting vessel, an ice or nitrogen condensation trap, a heat sink, cooling ribs, and a heat transfer media.

11. The filling machine according to claim 1, wherein means for the automatic drainage of the collecting vessel is provided which comprises a filling level sensor in an external collecting vessel and/or in the collecting vessel as well as in particular a flap and an aeration valve for aerating the external collecting vessel.

12. The filling machine according to claim 1, wherein the first channel and the second channel end in a collecting vessel arranged at the filling machine that is a bell,
    wherein in a first operating mode, the pumped-up medium is guided through the first channel, the collecting vessel, and the second channel,
    wherein in a second operating mode, the sucked-up medium from the first channel is connected with a feed line that is connected with the external container, and the discharge line of the external collecting vessel connected with the second channel directly or via the collecting vessel, and
    wherein, for selecting an operating mode, the collecting vessel that is a bell in which the connection means is integrated, is replaced by another collecting vessel, in which another connection means is integrated.

13. A method for operating a filling machine for filling up liquid or pasty mass, the filling machine comprising a feed pump for conveying said mass, a vacuum pump for generating a vacuum in the feed pump, wherein the feed pump is connectable with the vacuum pump via a first channel and via an integrated collecting vessel for entrained ingredients, and a connection means, wherein the feed pump is additionally connectable by the connection means to an external collecting vessel via the first channel, the method comprising:

selecting an operating mode for the filling machine; and
generating the vacuum in the feed pump by the vacuum pump, wherein
in a first operating mode, an evacuation opening of the feed pump is connected to the integrated collecting vessel for entraining pasty mass via a first channel, and wherein in a second operating mode, the evacuation opening of the feed pump is additionally connected to an external collecting vessel via the first channel.

14. The method according to claim 13, wherein, for selecting the first operating mode, the first channel, is connected with the evacuation opening in the feed pump and is connected with a second channel, the second channel located between the vacuum pump and the first channel, and, for selecting the second operating mode, the first channel is connected with a feed line to the external collecting vessel, and the second channel is connected with a discharge line of the external collecting vessel.

15. The method according to claim 13, wherein, in a second operating mode, the integrated collecting vessel and the external collecting vessel are arranged in series, and wherein either a pumped-up fluid first passes through the external collecting vessel and then through the collecting vessel, or the pumped-up fluid passes first through the collecting vessel and then through the external collecting vessel before reaching the vacuum pump.

16. The method according to claim 13, wherein a filling level control is performed in the collecting vessel, and wherein, if a certain filling level is exceeded, the filling machine is stopped or a warning signal is emitted.

* * * * *